(12) United States Patent
Oriani

(10) Patent No.: US 9,068,066 B2
(45) Date of Patent: Jun. 30, 2015

(54) HEAT RESISTANT HYDROCARBON ELASTOMER COMPOSITIONS

(71) Applicant: E I DU PONT DE NEMOURS AND COMPANY, Wilmington, DE (US)

(72) Inventor: Steven R Oriani, Landenberg, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/085,260

(22) Filed: Nov. 20, 2013

(65) Prior Publication Data

US 2014/0155537 A1    Jun. 5, 2014

Related U.S. Application Data

(60) Provisional application No. 61/733,086, filed on Dec. 4, 2012.

(51) Int. Cl.
| | |
|---|---|
| *C08L 23/08* | (2006.01) |
| *C08L 77/00* | (2006.01) |
| *C08L 23/16* | (2006.01) |
| *C08L 77/02* | (2006.01) |
| *C08L 77/06* | (2006.01) |

(52) U.S. Cl.
CPC .............. *C08L 23/083* (2013.01); *C08L 23/08* (2013.01); *C08L 77/00* (2013.01); *C08L 23/0846* (2013.01); *C08L 23/16* (2013.01); *C08L 77/02* (2013.01); *C08L 77/06* (2013.01)

(58) Field of Classification Search
CPC .......... C08L 23/08; C08L 77/00; C08L 23/16
USPC ............................ 524/504, 514; 525/184, 64
See application file for complete search history.

(56) References Cited

U.S. PATENT DOCUMENTS

| | | | |
|---|---|---|---|
| 4,174,358 A | 11/1979 | Epstein | |
| 4,275,180 A | 6/1981 | Clarke | |
| 4,310,638 A | 1/1982 | Coran et al. | |
| 4,694,042 A | 9/1987 | Mckee et al. | |
| 5,070,145 A | 12/1991 | Guerdoux | |
| 5,591,798 A | 1/1997 | Patel | |
| 5,777,033 A | 7/1998 | Venkataswamy et al. | |
| 5,948,503 A | 9/1999 | Yamamoto et al. | |
| 7,544,757 B2 | 6/2009 | Wu et al. | |
| 7,691,943 B2 | 4/2010 | Hoffmann et al. | |
| 7,915,336 B2 | 3/2011 | Varnhorn et al. | |
| 2006/0004147 A1 | 1/2006 | Park et al. | |
| 2006/0100368 A1 | 5/2006 | Park | |

FOREIGN PATENT DOCUMENTS

| | | |
|---|---|---|
| EP | 1081188 A1 | 3/2001 |
| EP | 2098566 A1 | 2/2009 |
| JP | H10-251452 | 9/1998 |
| JP | 2001-1191387 A | 7/2001 |
| JP | 2007204674 A | 8/2007 |
| KR | 2009-0053585 A | 5/2009 |
| KR | 1020090053585 A * | 5/2009 |
| WO | 2012177879 A1 | 12/2012 |

OTHER PUBLICATIONS

International Search Report for International Application No. PCT/US2013/072960 Feb. 26, 2014.
Welker et al., "A New EPDM Grade with Improved Processing Characteristics for Automotive Hose Applications", present at the ACS Rubber Division technical meeting Oct. 2011.
Yu et al.: "Effect of EVM/EVA-g-MAH ratio on the structure and properties of nylon 1010 blends", Journal of Polymer Science Part B: Polymer Physics, vol. 47, No. 9, May 1, 2009, pp. 877-887, XP055109122, ISSN: 0887-6266, DOI: 10.1002/polb.21693.
Zeon Chemicals L.P., HyTemp® Technical Manual, Rev. 2009-1, p. 46 (2009).

* cited by examiner

*Primary Examiner* — Michael M Bernshteyn

(57) ABSTRACT

Disclosed herein is a curable composition comprising ethylene copolymer elastomer, a relatively small amount of a polyamide, and optionally a compatibilizer wherein curable composition demonstrates improved heat aging properties without the loss of tensile strength. Also disclosed is the process for making such curable ethylene copolymer elastomer.

21 Claims, No Drawings

HEAT RESISTANT HYDROCARBON ELASTOMER COMPOSITIONS

CROSS-REFERENCE TO RELATED APPLICATIONS

This application claims priority from U.S. Patent Application No. 61/733,086, filed on Dec. 4, 2012, which is incorporated herein by reference in its entirety.

FIELD OF THE INVENTION

The present invention is directed to curable hydrocarbon elastomer compositions having enhanced heat aging performance, and thermoset articles produced by the process.

BACKGROUND OF THE INVENTION

Ethylene copolymer elastomers are polymerized from ethylene and an alpha-olefin such as propylene, 1-butene, 1-hexene, 1-octene, or the like. The comonomer disrupts ethylene crystallinity at room temperature, which would otherwise produce a stiff and inelastic polymer. Typically, ethylene copolymer elastomers comprise less than about 75 wt % ethylene so as achieve a low modulus and good elastic recovery in thermoset applications.

For elastomer applications requiring resistance to temperatures in excess of about 70° C., the ethylene copolymer elastomer must be crosslinked. Free radical crosslinking may be accomplished by compounding the elastomer with peroxide or exposing an article to high energy radiation such as an electron beam. Improved reactivity towards free radical curing can be achieved by copolymerizing an unsaturated cure site monomer with ethylene and an alpha-olefin. The unsaturated cure site monomer also permits curing of the ethylene copolymer elastomer by sulfur, phenolic resin, or hydrosilation.

Ethylene copolymer elastomers comprise ethylene and an alpha-olefin, with or without a non-conjugated diene cure site monomer. Ethylene copolymer elastomers comprising ethylene, propylene, and a non-conjugated diene monomer such as ethylidene norbornene are widely available and known as EPDM rubber. In the uncrosslinked state, these polymers are generally referred to as ethylene copolymer elastomer gums, or ethylene copolymer elastomer gum rubbers. Examples of commercially available crosslinkable ethylene copolymer elastomer gums include Engage® and Nordel® from The Dow Chemical Company, Midland, Mich. USA and Vistalon® and Exact® from Exxon-Mobil Corp, Irving, Tex., USA. The resulting crosslinked articles have good heat and water resistance as well as desirable electrical properties, making them suitable for wire and cable jacketing and a wide range of automotive applications including hoses, ignition cable jacketing and boots, vibration dampeners, weather stripping, and seals.

Resistance to heat aging is a particularly desirable property in rubber parts that are used in certain wire and cable jacketing applications, as well as many under the hood automotive applications, e.g. hoses, gaskets, and seals. Because such parts may be exposed to temperatures in excess of 150° C. for periods of time, including up to several hours on a regular basis, degradation of physical properties through oxidative embrittlement can occur. In ethylene copolymer elastomers, a reduction in the strength and extensibility of the crosslinked article often results. Such effects are disclosed for example in the published presentation "A New Grade of EPDM with Improved Processing Characteristics for Automotive Hose" by M. Welker et al., presented at the ACS Rubber Division technical meeting, October 2011. Methods to enhance heat aging resistance of crosslinked ethylene copolymer elastomer compounds have involved increasing ethylene content and decreasing carbon black content in the compound to maintain constant hardness, but the high ethylene level increases polymer crystallinity and degrades elastic properties. More effective antioxidants have also been sought. However, there is still a need to improve the high temperature resistance of crosslinked articles from ethylene copolymer elastomer compounds.

Ethylene copolymer elastomer compounds generally comprise both reinforcing filler and plasticizer. Reinforcing filler increases hardness and strength of the cured compound, whereas plasticizers lower the viscosity of the compound, as well as the hardness and strength of the cured article. Manipulating filler and plasticizer levels in a curable ethylene elastomer compound allows the cured articles to meet a variety of application requirements, but hot air aging can be modified only slightly through these techniques.

It has now been found possible to produce cured ethylene elastomer compositions having excellent hot air heat aging resistance through the use of a small amount, relative to other components in the composition, of polyamide dispersed in an ethylene copolymer elastomer gum. The polyamide content is sufficiently low that compound hardness, strength, elasticity, and other properties such as processability are essentially unchanged as a result of inclusion of the polyamide.

U.S. Pat. No. 3,965,055 discloses vulcanizates prepared from a blend of rubber and 2% to 10% of a crystalline fiber-forming thermoplastic, wherein the thermoplastic is dispersed in the rubber component in particles not greater than 0.5 micron in cross section with a length to diameter ratio greater than 2. The fibrous thermoplastic increases the green strength of the compound, thereby reducing the tendency to sponge during low pressure curing. The rubber may be EPDM and the thermoplastic may be a polyamide.

U.S. Pat. No. 4,966,940 discloses vulcanized rubber compositions comprising an ethylene alpha-olefin copolymer rubber, an ethylene alpha-olefin copolymer rubber containing an unsaturated carboxylic acid or a derivative thereof, and 5 to 100 phr of a polyamide resin.

U.S. Pat. No. 6,133,375 discloses blends of functionalized rubbers with thermoplastics in which the thermoplastic component is dispersed in the rubber phase. Following addition of a curative for the rubber, the composition is crosslinked to produce a vulcanized article. Examples of functionalized rubbers disclosed include acrylic rubbers such as nitrile-butadiene rubber, hydrogenated nitrile-butadiene rubber, epichlorohydrin rubber, and rubbers on which reactive groups have been grafted, such as carboxylated nitrile-butadiene rubber. Non-functionalized rubbers include EPDM, and these may be used provided a functionalized rubber is present. Thermoplastics that are disclosed include polyetherester block copolymers, polyurethanes, polyamides, polyamide ether or ester block copolymers, and mixtures of polyamides and polyolefins. The thermoplastic component is present in sufficient amounts to increase the modulus at small elongations, and reduce the breaking stress by no more than 10% in the vulcanized article, relative to a compound lacking the thermoplastic component.

U.S. Pat. No. 8,142,316 discloses power transmission belts comprising an elastomeric/thermoplastic material for the insulation section of the belt. The thermoplastic may be a polyamide and the elastomer may be an EPDM rubber. The thermoplastic is present in amounts of 10 to 50 phr, and the rubber is present in amounts of 50 to 90 phr. The elastomeric/thermoplastic material further contains 15 to 75 phr carbon black.

U.S. Pat. No. 7,608,216 and U.S. Patent Application Publication 2006/0100368 disclose compositions prepared by admixing an uncured elastomer with a thermoplastic polymer or another uncured (gum) elastomer. Techniques such as fractional curing, partial dynamic vulcanization, or the use of high performance reinforcing fillers are disclosed to increase the green strength of the uncured or partially cured compound. The admixed compositions may be subsequently crosslinked with a curing agent for the elastomer component.

Thermoplastic elastomers comprising polyamides and ethylene copolymers are also known. Such compositions, often known as thermoplastic vulcanizates or TPVs, are produced by crosslinking an elastomer while simultaneously mixing with molten thermoplastic. This process, known as dynamic vulcanization, causes the thermoplastic to become the continuous phase of the blend. EP922732 discloses TPVs comprising a thermoplastic that may be a polyamide, a carboxylic acid, epoxy, hydroxyl, anhydride, or amine functionalized rubbery ethylene, and a halogenated rubbery of para-alkylstyrene and monoisoolefin of 4 to 7 carbon atoms.

Polymer 43 (2002) 937-945 discloses blends of EPDM and polyamides compatibilized by maleic anhydride, glycidyl methacrylate grafted EPDM, or chlorinated polyethylene (CPE). The polyamides have a melting peak temperature of 150° C. or less. The cured compositions comprise 46 to 50 phr N220 carbon black. The polyamide is present at high levels (at least 10 wt %), in the form of a fibril.

Polymers & Polymer Composites 11(2003) 179-188 discloses compatibilized blends of EPDM and low melting peak temperature polyamide (150° C.) of at least 10 phr or more. The blends are cured at 160° C., above the melting peak temperature of the polyamide, and display weak cure response (MDR torque increase of 2 dN-m or less). The authors note that it is difficult to blend EPDM with high melting peak temperature polyamides such as PA6 or 6/6.

It has now surprisingly been found that when a low level of polyamide particles with a high melting peak temperature are dispersed in an ethylene copolymer elastomer compound, the resultant cured compositions exhibit enhanced resistance to physical property loss during heat aging. The polyamide content is sufficiently low so as not to interfere with the tensile strength, modulus, and hardness, or elastic properties that characterize conventional ethylene copolymer elastomer compositions.

SUMMARY OF THE INVENTION

Disclosed herein is a curable elastomer composition, said composition comprising: (a) an ethylene copolymer elastomer; (b) a polyamide having a melting peak temperature of about or greater than about 160° C. as determined by ASTM D3418-08, wherein said polyamide is present in at least an effective amount to improve hot air aging, but not more than 5 phr; (c) a curative; and (d) optionally, compatibilizer.

A process for making the aforementioned curable elastomer composition, said process comprising: (i) dispersing said polyamide in ethylene copolymer elastomer gum by mixing at a temperature above the melting peak temperature of the polyamide to provide a blend; (ii) optionally, adding compatibilizer; (iii) cooling said blend below crystallization peak temperature of said polyamide, such that the blend has a Mooney viscosity (ML 1+4, 125° C.) less than about 200; (iv) optionally mixing the same or different ethylene copolymer elastomer gum into the blend from (iii) as needed to produce a blend of polyamide and ethylene copolymer comprising about 5 phr of less polyamide; and (v) adding a curative into the blend comprising about 5 phr or less polyamide at a temperature less than the melting peak temperature of the polyamide.

DETAILED DESCRIPTION OF THE INVENTION

The present invention relates to a curable composition comprising an ethylene copolymer elastomer gum in which a small amount, less than 5 phr, of polyamide particles are dispersed. It has been found that when an ethylene copolymer elastomer gum comprising low levels of polyamide particles is mixed with ingredients to produce a curable ethylene elastomer composition, the cured composition exhibits surprising improvements in physical properties. That is, the curing process, commonly referred to as crosslinking or vulcanization, converts the ethylene copolymer elastomer gum comprising dispersed polyamide particles to an ethylene elastomer composition that exhibits enhanced heat aging resistance compared to ethylene elastomer compositions lacking polyamide particles. The term "gum" refers to an ethylene copolymer elastomer in a substantially uncrosslinked state, i.e., an ethylene copolymer elastomer having a Mooney viscosity (ML 1+4, 125° C.) of 200 or less.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene, propylene, and 3 weight % of ethylidene norbornene", or a similar description. Such a description may be considered informal in that it does not refer to the comonomers as copolymerized units; in that it does not include conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when noted) of the stated comonomers. It follows as a corollary that a copolymer is not the product of a reaction mixture containing specific amounts of the comonomer units, unless expressly stated in limited circumstances to be such.

The abbreviation "phr" as used herein retains the conventional meaning of "parts per hundred rubber". Optionally, compatibilizer may be present in the curable composition disclosed herein to improve the dispersion of polyamide in the ethylene copolymer elastomer gum and the physical properties of the cured compound, but it is not necessary. When compatibilizer is present in compound, the parts per hundred (phr) of the polyamide is calculated based on the sum of compatibilizer and ethylene copolymer elastomer gum.

The ethylene copolymer elastomer gums that are used to prepare the ethylene elastomer compositions of the invention are curable gums, i.e. they are substantially uncured rubbers, and retain reactivity towards crosslinking, generally by sulfur based curatives, phenolic curatives, or free radical generators such as peroxides or electron beam exposure after blending with polyamide. By substantially uncured is meant that the unblended rubber has a sufficiently low viscosity to be shaped into a finished article by molding or extrusion. Preferably, the Mooney viscosity (ASTM D1646, ML 1+4 at 125° C.) of the ethylene copolymer elastomer gum is less than 200, more preferably less than 150 and most preferably less than 100.

By retaining reactivity towards crosslinking is meant that a sulfur, phenolic, or peroxide curable composition intended for production of a molded or extruded article (i.e. the composition that includes ethylene copolymer elastomer gum, polyamide, curative and optionally conventional filler) exhibits an increase in torque (MH-ML where ML refers to the minimum torque value measured and MH refers to the maximum torque value attained after the measurement of ML) when tested in a moving die rheometer (MDR 2000 or equivalent from Alpha Technologies, operating at an 0.5 degree arc at 180° C. for 10 minutes) of at least 2.5 dN-m, more preferably at least 4 dN-m, and most preferably more than 5.5 dN-m. By retaining reactivity towards crosslinking for an electron beam curable composition is meant that crosslinks are formed as a result of electron beam exposure. Electron beam curing of ethylene elastomers and analysis of molecular weight between crosslinks is described in "Electron Beam Curing of EMV and HNBR for Cable Compounds", by M La Rossa, C. Wrana, and D. Achten, Proceedings of the 55th International Wire and Cable Symposioum, 2005.

More specifically, the ethylene copolymer elastomer gums useful in the compositions disclosed herein comprise copolymerized units of ethylene with alpha-olefins such as propene, 1-butene, 1-hexene, 1-octene, 1-decene, and the like. Mixtures of these monomers may be used. There is no particular limiting level of these comonomers provided the ethylene content is about or less than about 75 wt % of the copolymer. When the ethylene content exceeds about 75 wt %, the ethylene copolymer becomes sufficiently crystalline at room temperature to impair desired elastomeric properties after curing. Therefore the term "ethylene copolymer elastomer" as used herein denotes an ethylene copolymer comprising less than about 75 wt. % ethylene. Optionally, a non-conjugated diene cure site monomer is copolymerized with ethylene in addition to the alpha-olefin, for example norbornene derivatives such as ethyl idene norbornene, dicyclopentadiene, 2-methyl-5-norbornene, or 2-buten-2-ylnorbonene-5; linear nonconjugated dienes such as 1,4-hexadiene or 2-methylpenta-1,4-diene; monocyclic diolefins such as 1,4-cycloheptadiene or 1,5-cyclooctadiene; bicyclic diolefins such as 4,7,8,9,-tetrahydroindene or bicycle[3,2,0]-2,6-heptadiene and polyalkyenylcycloalkanes such as 1,2-divinylcyclobutane. Preferable cure site monomers are ethylidene norbornene, 1,4-hexadiene, and dicyclopentadiene. There is no particular limiting level of cure site monomer for the practice of composition disclosed herein.

The ethylene copolymer elastomer gums useful in the practice of the invention are curable, i.e. crosslinkable. Absent a cure site monomer, the elastomer is curable by free radical processes, for example by decomposition of a peroxide or exposure to high energy radiation such as electron beam.

Ethylene copolymer elastomer gums of this type may be prepared for example according to the procedures described in U.S. Pat. No. 2,933,480.

The blend composition used to prepare the curable compositions described herein comprises an ethylene copolymer elastomer gum in which a small amount of polyamide has been dispersed. The polyamide has a melting peak temperature greater than 160° C. as determined in accordance with ASTM D3418. Preferably the polyamide is solid at the curing temperature of the ethylene copolymer elastomer, meaning that the curing temperature is less than the melting peak temperature of the polyamide. While not wishing to be bound by theory, when the polyamide not solid at the curing temperature, curative readily diffuses into the polyamide, rendering the blend difficult to cure. Preferably, the melting peak temperature of the polyamide is greater than 180° C., most preferably greater than 200° C.

Polyamide resins are well known in the art and embrace those semi-crystalline resins having a weight average molecular weight of at least 5,000 and include those polyamide compositions that are commonly referred to as nylons. Thus, the polyamide component useful in the practice of the invention includes polyamides and polyamide resins such as nylon 6, nylon 7, nylon 6/6, nylon 6/10, nylon 6/12, nylon 11, nylon 12, polyamides comprising aromatic monomers, and poly(amide 6-b-ethylene oxide). The resins may be supplied and used in any physical form, such as pellets and particles of any shape or size, including nanoparticles.

The viscosity of the polyamide resin can be characterized by inherent viscosity, and can vary widely while meeting the aims of the present invention. Polyamides with high inherent viscosity are more effective in stabilizing the ethylene copolymer elastomer against hot air aging, and are therefore preferred. Preferably the polyamide has an inherent viscosity greater than 0.88 dL/g, more preferably greater than 1.0 dL/g, and most preferably greater than 1.2 dL/g, as measured per ASTM D2857-95, using 96% by weight sulfuric acid as a solvent at a test temperature of 25° C.

The polyamide resin can be produced by condensation polymerization of equimolar amounts of a saturated dicarboxylic acid containing from 4 to 12 carbon atoms with a diamine, in which the diamine contains from 4 to 14 carbon atoms. Examples of polyamides include polyhexamethylene adipamide (66 nylon), polyhexamethylene azelaamide (69 nylon), polyhexamethylene sebacamide (610 nylon) and polyhexamethylene dodecanoamide (612 nylon), the polyamide produced by ring opening of lactams, i.e. polycaprolactam, polylauric lactam, poly-11-aminoundecanoic acid, and bis(paraaminocyclohexyl)methanedodecanoamide. It is also possible to use polyamides prepared by the copolymerization of two of the above polymers or terpolymerization of the above polymers or their components, e.g. an adipic, isophthalic acid hexamethylene diamine copolymer.

Typically, polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic.

Fully aliphatic polyamides useful in practice of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid, pimelic acid, suberic acid, azelaic acid, decanedioic acid, dodecanedioic acid, tridecanedioic acid, tetradecanedioic acid, and pentadecanedioic acid. Diamines can be chosen from diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides are also suitable for use in the present invention. Such polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids. Alternatively, an aromatic diamine such as meta-xylylene diamine can be used to provide a semi-aromatic polyamide, an example of which is a homopolymer comprising meta-xylylene diamine and adipic acid.

Preferred polyamides are homopolymers or copolymers wherein the term copolymer refers to polyamides that have two or more amide and/or diamide molecular repeat units.

The polyamide component may comprise one or more polyamides selected from Group I polyamides having a melting peak temperature of greater than 160° C., but less than 210° C., and comprising an aliphatic or semiaromatic polyamide, for example poly(pentamethylene decanediamide), poly(pentamethylene dodecanediamide), poly(ε-caprolactam/hexamethylene hexanediamide), poly(ε-caprolactam/hexamethylene decanediamide), poly(12-aminododecanamide), poly(12-aminododecanamide/tetramethylene terephthalamide), and poly(dodecamethylene dodecanediamide); Group (II) polyamides having a melting peak temperature of at least 210° C., and comprising an aliphatic polyamide selected from the group consisting of poly(tetramethylene hexanediamide), poly(ε-caprolactam), poly(hexamethylene hexanediamide), poly(hexamethylene dodecanediamide), and poly(hexamethylene tetradecanediamide); Group (III) polyamides having a melting peak temperature of at least 210° C., and comprising about 20 to about 35 mole percent semiaromatic repeat units derived from monomers selected from one or more of the group consisting of (i) aromatic dicarboxylic acids having 8 to 20 carbon atoms and aliphatic diamines having 4 to 20 carbon atoms; and about 65 to about 80 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (IV) polyamides comprising about 50 to about 95 mole percent semiaromatic repeat units derived from monomers selected from one or more of the group consisting of aromatic dicarboxylic acids having 8 to 20 carbon atoms and aliphatic diamines having 4 to 20 carbon atoms; and about 5 to about 50 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (V) polyamides having a melting peak temperature of at least 260° C., comprising greater than 95 mole percent semiaromatic repeat units derived from monomers selected from one or more of the group consisting of aromatic dicarboxylic acids having 8 to 20 carbon atoms and aliphatic diamines having 4 to 20 carbon atoms; and less than 5 mole percent aliphatic repeat units derived from monomers selected from one or more of the group consisting of an aliphatic dicarboxylic acid having 6 to 20 carbon atoms and said aliphatic diamine having 4 to 20 carbon atoms; a lactam and/or aminocarboxylic acid having 4 to 20 carbon atoms; The polyamide may also be a blend of two or more polyamides.

Preferred polyamides include nylon 6, 6/6, and Group IV polyamides having a melting peak temperature less than about 270° C. These polyamides have a melting peak temperature sufficiently high so as not to limit the scope of applications for the inventive materials, but not so high that production of the blends causes significant degradation of the ethylene copolymer elastomer gum.

Polyamides suitable for use in the curable compositions disclosed herein are widely commercially available, for example Zytel® resins, available from E. I. du Pont de Nemours and Company, Wilmington, Del., USA, Durethan® resins, available from Lanxess, Germany, and Ultramid® resins available from BASF, USA.

The blends of the invention comprising ethylene copolymer elastomer gum and a dispersion of polyamide may also comprise a polymer that functions as a compatibilizer for the ethylene copolymer elastomer gum and the polyamide. The compatibilizing polymer comprises ethylene and an amine or acid reactive moiety such as an anhydride, a half-ester of an anhydride, a carboxylic acid, acyl halide, or an epoxy group. The compatibilizing polymer must be present in the mixture when the polyamide is molten to function effectively. In some cases, the compatibilizer and the ethylene elastomer may be derived from the same ethylene elastomer, e.g., a maleic anhydride grafted EPDM. Suitable compatibilizers comprise Fusabond® resin and Elvaloy® resin, both of which are available from from E.I. du Pont de Nemours and Company, Wilmington, Del., USA. The compatibilizer can facilitate production of polyamide-ethylene copolymer masterbatches, i.e. blends of ethylene copolymer elastomer gum with a high content of polyamide (5 to 100 phr or more), which are subsequently diluted with additional ethylene copolymer elastomer gum. The dilution with ethylene copolymer elastomer gum to less than 5 phr polyamide may occur at any convenient temperature, either when the polyamide is molten or solidified.

The ethylene elastomer curable compositions disclosed herein comprise 100 phr of the ethylene copolymer elastomer gum and optional compatibilizer, and at least an effective amount of polyamide to improve hot air aging at about, or less than 5 phr. Preferably, the curable compositions comprise 0.1 phr to 5 phr polyamide, more preferably 0.5 phr to 4 phr polyamide, and most preferably 1 phr to 3 phr polyamide. At relatively small amounts, the presence of polyamide improves hot air aging of the cured ethylene elastomer compound without detracting from other properties, such as tensile strength, or without significantly altering the Shore A hardness of the finished article.

The blends comprising a dispersion of polyamide in an ethylene copolymer elastomer gum may be formed by mixing the polyamide component into the ethylene copolymer elastomer gum and optional compatibilizer at temperatures above the melting peak temperature of the polyamide, under conditions that do not produce a dynamic cure of the ethylene copolymer elastomer gum, followed by cooling of the blend. In general, such a blend composition may comprise a wide range of blend morphologies, ranging from discrete polyamide particles dispersed within an ethylene copolymer gum matrix, to high aspect ratio polyamide "threads", to co-continuous structures, to discrete ethylene copolymer domains within a continuous phase of polyamide. When 5 phr or less polyamide is melt mixed with the ethylene copolymer elastomer gum, the polyamide comprises such a low volume fraction that the polyamide becomes a dispersed phase in the blend, and the ethylene copolymer elastomer gum becomes the continuous phase. Preferably, the polyamide is dispersed as nearly spherical droplets in a continuous phase of ethylene copolymer elastomer gum. The size of the particles is relatively unimportant, because the polyamide is present in the final cured composition at such low levels that it has little influence on the physical properties prior to hot air aging. Those skilled in the art of polymer blending can easily achieve a dispersion of nearly spherical polyamide droplets by manipulating the inherent viscosity and concentration of polyamide in the blend, the presence and amount of compatibilizer, and the mixing and cooling conditions.

The blend of ethylene copolymer elastomer gum and polyamide may be produced at polyamide concentrations greater than 5 phr polyamide, provided the blend is diluted by mixing additional of the same or different ethylene elastomer copolymer gum, so that the curable composition as disclosed herein comprises about 5 phr or less polyamide. When such dilution occurs at a temperature less than the melting peak temperature of the polyamide, it is preferable that the high concentration polyamide blend exhibits a Mooney viscosity less than about 200 (ML 1+4, 125° C.). When the Mooney viscosity cannot be measured because the blend cannot be formed into a Mooney specimen, or the specimen crumbles during the Mooney test, or the Mooney viscosity exceeds about 200, then the high concentration blend will be difficult to homogeneously dilute to about 5 phr or less polyamide. When the high concentration blend of polyamide and ethylene copolymer elastomer gum exhibits a Mooney viscosity less than about 200, it can easily be further diluted with ethylene copolymer elastomer gum, at a temperature less than the melting peak temperature of the polyamide, to form a dispersion of 5 phr or less polyamide in the ethylene copolymer elastomer gum.

To form a blend of polyamide and ethylene copolymer elastomer gum, the mixing step may be conducted on a heated two-roll rubber mill but is preferably conducted in internal mixing equipment used to process thermoplastic compounds or formulations because of the high temperatures used. Such equipment includes Banbury® internal mixers, Haake Rheocord® mixers, Brabender Plastographs®, single and twin screw extruders, and Buss® Kneaders. The mixing step provides a polymer blend composition that, when cooled, comprises a macroscopically homogeneous mixture with an ethylene copolymer elastomer gum as a continuous phase and a polyamide discrete phase. After the ethylene copolymer elastomer gum, polyamide, and optional compatibilizer have been mixed at a temperature greater than the melting peak temperature of the polyamide for a period sufficient to disperse the melted polyamide in a continuous phase of ethylene copolymer elastomer gum, the mixture is cooled to a temperature below the crystallization peak temperature of the polyamide. The blending and compatibilization process typically reduces the crystallization peak temperature of the polyamide to a temperature less than that of the pure polyamide. In some instances, the blend of polyamide and ethylene copolymer elastomer gum exhibits multiple polyamide crystallization peak temperatures, even though the pure polyamide exhibits a single crystallization event. In these instances, the blend should be cooled to a temperature below the lowest crystallization peak temperature, or, if the crystallization peak temperature is not known, to 40° C. The blend of polyamide and ethylene copolymer elastomer gum may comprise any level of polyamide, provided the Mooney viscosity (ML1+4, 125° C.) may be determined to be about 200 or less.

In addition to the ethylene elastomer copolymer gum and the polyamide, the blending step used to disperse the polyamide in the ethylene copolymer elastomer may also incorporate processing aids and compounding ingredients that are chemically stable at the mixing temperature, i.e. above 160° C. Generally, this will not include crosslinking or curing agents, accelerators, or scorch retarders. Such components generally react or decompose to some degree at temperatures of 160° C. or higher. Most commonly, ingredients such as conventional reinforcing fillers, colorants, antioxidants, processing aids, plasticizers and the like will be added during a low temperature mixing process, for example during the step wherein a curing agent is added. These additives may be in any physical form, including in the form of nanoparticles. After cooling, the blend of polyamide and ethylene copolymer elastomer gum can be mixed in conventional rubber processing equipment with curatives, accelerators, coagents, fillers, additional ethylene copolymer elastomers, anti-oxidants, process aids, plasticizers, waxes, release aids, acid scavengers, colorants, and the like, provided the Mooney viscosity (ML1+4, 125° C.) of the blend is about 200 or less, thereby providing a curable composition of the invention.

The curable composition may then be formed into an article and cured by inducing a crosslinking reaction in one or more subsequent process steps.

The inventive compositions may comprise fillers of any type or amount, though optimal hot air aging resistance is obtained when the total surface area of the filler in the compound is minimized. Examples of fillers that may be included in compositions of this invention are carbon black, hydrated alumina, calcium carbonate, barium sulfate, titanium dioxide, silica, and silicate minerals such as magnesium silicate, kaolin, and montmorillonite. The fillers may be present in forms well known in the art, including in the form of so-called nano-materials where at least one of the dimensions of the particles is smaller than 100 nm.

Preferably the curable ethylene elastomer compounds of the invention will be vulcanized by addition of a peroxide or in the presence of high energy radiation, e.g., by electron beam curing. Suitable peroxide curatives, also known as peroxide curing systems, comprise peroxide and optionally a coagent. The peroxide cure system may be added to the blend of polyamide and ethylene copolymer elastomer gum by conventional rubber mixing techniques. Examples of peroxides and coagents include curative systems as generally known in the art, including those described herein, operative at the temperature employed during vulcanization. For example, useful organic peroxides are those that decompose rapidly within the temperature range of 150° C. to 250° C. These include, for example, dicumyl peroxide, 2,5-bis(t-butylperoxy)-2,5-dimethylhexane, and $\alpha',\alpha'$-bis(t-butylperoxy)-diisopropylbenzene (available from Arkema Inc. under the tradename Vul-Cup®). In a typical vulcanizate composition the peroxide is present in amounts of from about 0.5 to 5 parts phr. The peroxide may be adsorbed on an inert carrier such as calcium carbonate, carbon black or kieselguhr; however, the weight of the carrier is not included in the above range. Generally, an optional coagent will be present to increase the state of cure of the finished part. The coagent can be for example, N, N'-(m-phenylene)dimaleamide, trimethylolpropane trimethylacrylate, tetraallyloxyethane, triallyl cyanurate, tetramethylene diacrylate, or polyethylene oxide glycol dimethacrylate. A preferred coagent is triallyl cyanurate, available from Sartomer Corp. as SR507A. The amount of the coagent used is generally about 0 to 5 parts by weight per 100 parts ethylene copolymer elastomer (phr), preferably about 1 to 5 parts phr. The coagents usually contain multiple unsaturated groups such as allyl or acrylic esters. While their mode of action is not known with certainty, it is thought that they react with the initial radical formed on the polymer backbone to form a more stable radical, which undergoes coupling reactions to form crosslinks more readily than chain scission reactions.

For electron beam curing, addition of a co-agent is strongly favored to improve crosslinking efficiency. A preferred co-agent for electron beam curing is trimethylolpropane trimethacrylate.

The addition of curative to the blend of ethylene copolymer elastomer gum and polyamide will desirably take place at a temperature below the decomposition temperature of the curative and below the melting peak temperature of the polyamide. Generally, the addition will take place at a temperature below 140° C., preferably at a temperature no greater than 120° C. The addition of the curative may take place simultaneously with the addition of optional processing ingredients, such as colorants, carbon black or inorganic reinforcing agents, antioxidants, processing aids, and plasticizers, or it may be an operation separate from addition of other ingredients. The addition may be conducted on a two-roll rubber mill or by using internal mixers suitable for compounding gum rubber compositions, including Banbury® internal mixers, Haake Rheocord® mixers, Brabender Plastograph® mixers, Farrel Continuous Mixers, or single and twin screw extruders.

Curing or crosslinking of the curable ethylene elastomer composition comprising a polyamide dispersion, also referred to as vulcanization, can be achieved by means known to cure ethylene copolymer elastomers, and typically involves exposing the curable composition to elevated temperature and elevated pressure for a time sufficient to crosslink the copolymer. Such operations generally are conducted by placing the curable composition into a mold that is heated in a press (often referred to as press-curing). Extruded parts are often cured in a pressurized autoclave. After the press cure or autoclave cycle is completed, this initial cure may be followed by an optional post cure heating cycle at ambient pressure to further cure the ethylene copolymer elastomer. For example, the vulcanizate may be formed and cured using conventional press cure procedures at about 160° C. to about 200° C. for about 2 to 60 minutes. Post-cure heating may be conducted at about 160° C. to about 200° C. for one to several hours. Once crosslinked, the compositions described herein are not thermoplastic, but thermoset. Suitable cure conditions will depend on the particular formulation and are known to those of skill in the art.

To achieve optimal heat aging resistance, an antioxidant is desirably added to the compound prior to curing. Useful antioxidants include, but are not limited to, aryl amines, phenolics, imidazoles, and phosphites. Thus, in some embodiments, the antioxidant will be a phosphorus ester antioxidant, a hindered phenolic antioxidant, an amine antioxidant, or a mixture of two or more of these compounds. The proportion of the antioxidant compound in the composition is typically 0.1 to 5 phr, preferably about 0.5 to 2.5 phr. The weight ratio of the phenolic or amine antioxidant to the phosphorus compound in the mixtures is about 0.5 to 3, and preferably the ratio is about 1.

Examples of aryl amines that may be useful antioxidants include 4,4'-bis($\alpha,\alpha$-dimethylbenzyl)diphenylamine, diphenylamine and alkylated diphenylamines, and N-phenyl-N'(p-toluenesulfonyl)-p-phenylenediamine. Examples of phenolic antioxidants include 4,4'-butylenebis(6-t-butyl-m-cresol), 1,3,5-trimethyl-2,4,6-tris-(3,5-di-t-butyl-4-hydroxybenzyl) benzene, and 4,4'-thiobis-(3-methyl-6-t-butylphenol). Examples of phosphite anti-oxidants include triphenylphosphite, bis(2,4-di-t-butylphenyl) pentraerythritol diphosphite, and tris(2,4-ditert-butylphenyl)phosphite. Examples of imidazole antioxidants include 2-mercaptomethylbenzimidazole, and 2-mercaptobenzimidazole. Combinations of antioxidants may be used, generally at levels between 0.5 and 5 phr based on 100 parts of the ethylene copolymer elastomer rubber in the compound.

Suitable hindered phenolic antioxidants can be, for example 4,4'-butylidenebis(6-t-butyl-m-cresol), 1,3,5-trimethyl-2,4,6-tris-(3,5-di-t butyl-4-hydroxybenzyl)benzene, 2,6-di-t-butyl-a-dimethylamino-p-cresol and 4,4'-thiobis-(3-methyl-6-t-butylphenol).

Preferred antioxidant compositions contain tri(mixed mono- and dinonylphenyl) phosphate mixed with either 4,4'-butylidenebis(6-t-butyl-m cresol) or 4,4'-bis($\alpha,\alpha$-dimethylbenzyl)diphenylamine. Preferred antioxidant compositions contain 4,4'-bis($\alpha,\alpha$-dimethylbenzyl)diphenylamine (available commercially as Naugard® 445 from Chemtura Corp.). Anti-oxidants may be added while the ethylene copolymer elastomer gum is melt mixed with the polyamide, or after the blend has cooled.

The vulcanizates prepared from the curable ethylene elastomer compositions comprising a dispersion of polyamide exhibit unusually good resistance to embrittlement during heat aging, as evidenced by a reduction in the amount of decrease in tensile elongation at break following hot air aging at 175° C. for one week. For example, cured ethylene copolymer elastomers tend to lose over 80% of their extensibility after hot air aging for one week at 175° C. Including less than 3 phr polyamide dispersed in the compound can reduce the loss to 50% or less. This degree of improvement is unusual.

Vulcanizates of the ethylene elastomer compositions comprising a dispersion of polyamide, prepared according to the teachings herein, can be used in a wide variety of industrial applications, for production of articles including wire and cable jacketing, spark plug boots, molded or extruded tubing or hose, or molded boots, hoses, belts, grommets, seals and gaskets. Hose applications include radiator hoses, air conditioning hoses, air ducts, fuel line covers, and vent hoses.

Examples of seals include O-rings and gaskets in the cooling system and brake system, as well as belt cover seals.

Automotive tubing applications include axle vent tubing, PCV tubing and other emission control parts. The vulcanizates are also useful for manufacture of crankshaft torsional dampers where high damping over a broad temperature range is needed under high compressive and shear strains. The vulcanizates also can be used to prepare noise management parts such as grommets.

The invention is further illustrated by the following examples wherein all parts are by weight unless otherwise indicated.

EXAMPLES

Materials

ECP1 Nordel® 3720P, ethylene copolymer elastomer of composition 69 wt % ethylene, 30.5% propylene, and 0.5% ethylidene norbornene. Mooney viscosity (ML1+4, 125° C.) of 20, available from The Dow Chemical Company.

ECP2 Nordel® 4520, ethylene copolymer elastomer of composition 50 wt % ethylene, 45 wt % propylene, and 5% ethylidene norbornene. Mooney viscosity (ML1+4, 125° C.) of 20, available from The Dow Chemical Company.

PA1 Polyamide 6, inherent viscosity of 1.450 dL/g, melting peak temperature 220° C., available from BASF Corp. as Ultramid® B40.

PA2 Polyamide 6/6, having a melting peak temperature of 260° C. and inherent viscosity of 1.002 dL/g.

PA3 Polyamide 6/10, having a melting peak temperature of approximately 225° C. and inherent viscosity of 1.167 dL/g.
PA4 Polyamide 11 having a melting peak temperature of 180° C., available from Arkema Chemicals Inc. as Rilsan® BESNO.
C1 Anhydride modified ethylene copolymer, available from DuPont as Fusabond® N493.
Peroxide: mixture of the para and meta isomers of an α,α'-bis(tert-butylperoxy)-diisopropylbenzene, 40% peroxide active ingredient on kaolin clay carrier, Vul-Cup® 40KE, available from Arkema Inc.
Coagent: Triallylcyanurate, available from Sartomer Corp. as SR507A.
Carbon black: N550 grade, Sterling® SO carbon black, available from Cabot Corp.
Antioxidant (AO): Naugard® 445 available from Chemtura Corp.
Zinc oxide: available from Hallstar Corp. as Kadox® 911

Test Methods

Mooney viscosity: ASTM D1646, ML 1+4, 125° C.
Cure response: Measured per ASTM D5289-07a using an MDR 2000 from
Alpha Technologies operating at 0.5° arc. Test conditions of 180° C. for 10 minutes. ML refers to the minimum torque value measured during the test, while MH refers to the maximum torque value attained after ML.
ISO compression set: ISO 815-1:2008, 25% compression, 70 hour/175° C. test, using type B molded buttons prepared using press cure conditions of 175° C. for 15 minutes. Data reported are the median values of 3 specimens.
Tensile properties: ASTM D412-06, die C. Samples cut from 2.0 mm thick plaques press cured 15 minutes at 175° C. Data reported are the median values of 3 specimens. Modulus at elongations of 50%, 100%, and 200% are listed as M50, M100, and M200, respectively. The rupture properties of tensile strength and elongation are indicated as Tb and Eb, (tensile at break and elongation at break, respectively).
Shore A hardness: ASTM D2240-05, 1 second reading.
Heat aging: Tensile specimens, prepared as described above are hung in a hot air oven for one week at 175° C. The specimens are further conditioned at ambient conditions of 23° C. and 50% RH for at least 24 hours before tensile properties are measured.
Inherent viscosity of polyamides: Measured per D2857-95, using 96% by weight sulfuric acid as a solvent at a test temperature of 25° C. Samples were dried for 12 hours in a vacuum oven at 80° C. before testing.
Thermal transitions: Measured per ASTM D3418-08 using a differential scanning calorimeter operating at a heating and cooling rate of 10° C. per minute.

Example 1

Two blends of polyamide PA1 and ethylene copolymer elastomer ECP1 were produced according to the formulations in Table 1. Blend B1 comprises compatibilizer C1, whereas blend B2 does not. The blends were produced by charging the polymers to a Haake® Rheocord mixing bowl equipped with roller blades, operated at a set temperature of 240° C. (20° C. greater than the melting peak temperature of polyamide PA1) and at about 30 rpm rotor speed. Once the mixing bowl was fully charged, the rotor speed was increased to 100 rpm. Polymer blend melt temperature was monitored, and when the polymer blend temperature reached 220° C. (the melting peak temperature of the polyamide), a timer was started. At the same time, the setpoint for the bowl temperature was lowered to match the melting peak temperature of the polyamide, and air cooling of the bowl was initiated. After three minutes of mixing, the rotors were stopped, at which point the temperature of the polymer blend was in the range of 10° C. to 25° C. greater than the melting peak temperature of the polyamide. The blend was then removed from the bowl and cooled to room temperature (about 25° C.) before further processing.

The Mooney viscosity of blends B1 and B2 were measured, and found to be less than 200.

TABLE 1

|  | Blend | |
| --- | --- | --- |
|  | B1 % | B2 % |
| ECP1 | 60 | 80 |
| C1 | 10 |  |
| PA1 | 30 | 20 |
| Mooney Viscosity | | |
| (MU) | 37 | 23 |

Blends B1, B2, and unmodified ethylene copolymer elastomer gum ECP1 were used to produce curable compositions E1 through E8, and CE1, CE2, and CE3. The curable compositions comprise zero to 5.5 phr of PA1, and were produced by conventional roll mill mixing at approximately 60° C. to blend the ingredients as shown in Table 2.

TABLE 2

| | Curable composition | | | | | | | | | | |
| --- | --- | --- | --- | --- | --- | --- | --- | --- | --- | --- | --- |
| | CE1 phr | CE2 phr | E1 phr | E2 phr | E3 phr | E4 phr | CE3 phr | E5 phr | E6 phr | E7 phr | E8 phr |
| ECP1 | 100 | 87.18 | 89.49 | 93.01 | 96.49 | 98.82 |  |  |  |  |  |
| B1 |  | 18.32 | 15.01 | 9.99 | 5.01 | 1.68 | 78.02 | 81.98 | 88.01 | 93.99 | 97.99 |
| B2 |  |  |  |  |  |  | 27.48 | 22.52 | 14.99 | 7.51 | 2.51 |
| Peroxide | 7 | 7 | 7 | 7 | 7 | 7 | 7 | 7 | 7 | 7 | 7 |
| Coagent | 1 | 1 | 1 | 1 | 1 | 1 | 1 | 1 | 1 | 1 | 1 |
| Zinc oxide | 2 | 2 | 2 | 2 | 2 | 2 | 2 | 2 | 2 | 2 | 2 |
| Anti-oxidant | 1 | 1 | 1 | 1 | 1 | 1 | 1 | 1 | 1 | 1 | 1 |
| Carbon black | 50 | 50 | 50 | 50 | 50 | 50 | 50 | 50 | 50 | 50 | 50 |
| PA1 level (phr) | 0 | 5.5 | 4.5 | 3 | 1.5 | 0.5 | 5.5 | 4.5 | 3 | 1.5 | 0.5 |

TABLE 2-continued

| | CE1 phr | CE2 phr | E1 phr | E2 phr | E3 phr | E4 phr | CE3 phr | E5 phr | E6 phr | E7 phr | E8 phr |
|---|---|---|---|---|---|---|---|---|---|---|---|
| Cure Response | | | | | | | | | | | |
| ML (dN-m) | 1.1 | 1.3 | 1.4 | 1.3 | 1.3 | 1.2 | 1.3 | 1.3 | 1.3 | 1.2 | 1.2 |
| MH (dN-m) | 36.2 | 39.2 | 38.9 | 38.2 | 37.4 | 37.5 | 38.4 | 38.1 | 37.6 | 37.2 | 37 |
| MH − ML (dN-m) | 35.1 | 37.9 | 37.5 | 36.9 | 36.1 | 36.3 | 37.1 | 36.8 | 36.3 | 36 | 35.8 |
| Hardness and Tensile properties after press cure | | | | | | | | | | | |
| Shore A (pts) | 81 | 84 | 81 | 80 | 80 | 80 | 82 | 80 | 79 | 76 | 77 |
| Tb (MPa) | 24 | 24 | 25 | 26 | 23 | 23 | 19 | 15 | 14 | 23 | 19 |
| Eb (%) | 205 | 200 | 200 | 210 | 200 | 200 | 165 | 145 | 135 | 200 | 180 |
| Hardness and Tensile properties after press cure + 1 week hot air aging at 175° C. | | | | | | | | | | | |
| Shore A (pts) | 80 | 83 | 86 | 80 | 81 | 79 | 83 | 80 | 78 | 77 | 83 |
| Tb (MPa) | 3 | 15 | 15 | 15 | 16 | 11 | 10 | 13 | 14 | 6 | 9 |
| Eb (%) | 10 | 150 | 155 | 160 | 145 | 130 | 105 | 135 | 150 | 80 | 100 |

The test results in Table 2 show that all the curable compositions exhibit a strong cure response (MH-ML) of about 35 dN-m or greater. Physical properties after press cure show that CE1, which lacks polyamide, has a Shore A hardness of 81. Inventive compositions E1 through E8 have Shore A hardness of 81 or less, indicating that the presence of 0.5 to 4.5 phr polyamide does not increase the hardness of the cured compound. However, CE2 and CE3 comprise 5.5 phr polyamide, and the compounds do exhibit an increase in Shore A hardness compared to CE1.

After hot air aging for one week at 175° C., compound CE1 exhibits very poor tensile strength and elongation to break of 3 MPa and 10% respectively, whereas the comparative and inventive compositions comprising polyamide exhibit at least twice the tensile strength and eight times the elongation to break.

Example 2

Blends B3-B5 were made using ECP2 and PA2, PA3, or PA4 according to the formulations in Table 3. The blends were produced by charging the polymers to a Haake® Rheocord mixing bowl equipped with roller blades, operated at a set temperature of 20° C. greater than the melting peak temperature of polyamide in the blend, and at about 30 rpm rotor speed. Once the mixing bowl was fully charged, the rotor speed was increased to 100 rpm. Polymer blend melt temperature was monitored, and when the polymer blend temperature reached the melting peak temperature of the polyamide, a timer was started. At the same time, the setpoint for the bowl temperature was lowered to match the melting peak temperature of the polyamide, and air cooling of the bowl was initiated. After three minutes of mixing, the rotors were stopped, at which point the temperature of the polymer blend was in the range of 10° C. to 25° C. greater than the melting peak temperature of the polyamide. The blend was then removed from the bowl and cooled to room temperature (about 25° C.) before further processing.

TABLE 3

| | Blend | | |
|---|---|---|---|
| | B3 phr | B4 phr | B5 phr |
| ECP2 | 100 | 100 | 100 |
| PA2 | 2.04 | | |
| PA3 | | 2.04 | |
| PA4 | | | 2.04 |
| Mooney Viscosity | | | |
| (MU) | 20 | 22 | 21 |

ECP2 and blends B3-B4 were used to produce curable compositions CE4 and E9-E11 by conventional roll mill mixing at approximately 40° C. according to the formulations in Table 4.

TABLE 4

| Curable Composition | CE4 phr | E9 phr | E10 phr | E11 phr |
|---|---|---|---|---|
| ECP2 | 100 | | | |
| B3 | | 102.04 | | |
| B4 | | | 102.04 | |
| B5 | | | | 102.04 |
| Peroxide | 7 | 7 | 7 | 7 |
| Coagent | 1 | 1 | 1 | 1 |
| Zinc oxide | 2 | 2 | 2 | 2 |
| Anti-oxidant | 1 | 1 | 1 | 1 |
| Carbon black | 50 | 50 | 50 | 50 |
| Polyamide level | | | | |
| (phr) | 0 | 2.04 | 2.04 | 2.04 |
| Cure Response | | | | |
| ML (dN-m) | 1.1 | 1.3 | 1.4 | 1.3 |
| MH (dN-m) | 40.6 | 40 | 40.3 | 38.7 |
| MH − ML (dN-m) | 39.5 | 38.7 | 38.9 | 37.4 |
| Hardness and tensile properties after press cure | | | | |
| Shore A (pts) | 69 | 69 | 70 | 69 |
| Tb (MPa) | 14.2 | 14.2 | 13.6 | 15.7 |
| Eb (%) | 130 | 130 | 115 | 135 |

TABLE 4-continued

| Curable Composition | CE4 phr | E9 phr | E10 phr | E11 phr |
| --- | --- | --- | --- | --- |
| Hardness and tensile properties after press cure + 1 week hot air aging at 175° C. | | | | |
| Shore A (pts) | 78 | 74 | 73 | 71 |
| Tb (MPa) | 2 | 3.6 | 3.8 | 3.4 |
| Eb (%) | 5 | 35 | 40 | 30 |

The test results in Table 4 indicate that all the compounds exhibit a strong cure response, and similar Shore A hardness and tensile properties after press cure. After one week of hot air aging at 175° C., however, the inventive compounds E9-E11 comprising 2.04 phr of polyamide exhibit at least five times greater elongation to break than comparative compound CE4, and 70% to 90% greater tensile strength.

What is claimed is:

1. A curable elastomer composition, said composition comprising:
    (a) an ethylene copolymer elastomer gum comprising up to 75 wt % of copolymerized units of ethylene and 25 wt % or more of copolymerized units of one or more alpha-olefins, based on the total weight of the ethylene copolymer elastomer;
    (b) a polyamide having a melting peak temperature of about or greater than about 160° C. as determined by ASTM D3418-08, wherein said polyamide is present in an amount of 0.1 to 5 phr;
    (c) a curative; and
    (d) optionally, a compatibilizer.

2. The composition of claim 1 wherein said one or more alpha-olefins are selected from the group consisting of propene, 1-butene, 1-hexene, 1-octene, and 1-decene.

3. The composition of claim 1 wherein the polyamide has a melting peak temperature greater than 180° C.

4. The composition of claim 1 wherein the polyamide is present at a level from 0.5 phr to 4 phr.

5. The composition of claim 1 wherein the polyamide is present at a level from 1 phr to 3 phr.

6. The composition of claim 1 wherein said polyamide has a melting peak temperature less than about 270° C. and said polyamide comprises about 50 to about 95 mole percent semiaromatic repeat units and about 5 to about 50 mole percent aliphatic repeat units; wherein said semiaromatic repeat units are derived from monomers selected from one or more of the group consisting of an aromatic dicarboxylic acid having 8 to 20 carbon atoms and an aliphatic diamine having 4 to 20 carbon atoms; and wherein said aliphatic repeat units are derived from monomers selected from one or more of the group consisting of an aliphatic dicarboxylic acid having 6 to 20 carbon atoms, an aliphatic diamine having 4 to 20 carbon atoms, a lactam having 4 to 20 carbon atoms, and an aminocarboxylic acid having 4 to 20 carbon atoms.

7. The composition of claim 1 wherein said polyamide is selected from the group consisting of nylon 6 and nylon 6/6.

8. The composition of claim 1 wherein a compatibilizer is present.

9. The composition of claim 8 wherein said compatibilizer is a polymer comprising ethylene and an amine or acid reactive moiety.

10. The composition of claim 8 wherein the compatibilizer is a maleic anhydride grafted ethylene alpha-olefin.

11. The composition of claim 1 wherein said curative is a peroxide curative.

12. The composition of claim 1 wherein said composition has a cure response MH-ML of at least 2.5 dN-m as determined according to ASTM D5289-07a using test conditions of 0.5° arc and 180° C. for 10 minutes.

13. A process for making the curable elastomer composition of claim 1, said process comprising:
    (i) dispersing the polyamide in the ethylene copolymer elastomer gum by mixing at a temperature above the melting peak temperature of the polyamide to provide a blend;
    (ii) optionally, adding the compatibilizer;
    (iii) cooling the blend below the crystallization peak temperature of the polyamide, such that the blend has a Mooney viscosity (ML 1+4, 125° C.) less than about 200; and
    (iv) adding a curative into the blend at a temperature less than the melting peak temperature of the polyamide.

14. The process of claim 13, said process further comprising the step of mixing additives with said blend, at a temperature below the peak melting temperature of the polyamide, said additives selected from the group consisting of additional fillers, antioxidants, process aids, plasticizers, waxes, release aids, acid scavengers, colorants and property enhancers.

15. The process of claim 13 wherein said curative is a peroxide curative.

16. An article comprising the curable elastomer composition of claim 1.

17. The article of claim 16, wherein said curable elastomer composition is crosslinked.

18. The article of claim 17 that is selected from the group consisting of wire jacketing, cable jacketing, molded or extruded tubing, molded or extruded hose, molded boots, belts, grommets, seals and gaskets.

19. The composition of claim 1 wherein the polyamide has a melting peak temperature greater than 200° C.

20. The process of claim 13, wherein the blend has a polyamide concentration greater than 5 phr, further comprising the step of diluting the blend with an additional portion of ethylene elastomer copolymer gum to form the curable elastomer composition, wherein the additional portion of ethylene elastomer copolymer gum comprises the ethylene elastomer copolymer gum that is in the blend or a different ethylene elastomer copolymer gum.

21. The process of claim 13, further comprising the step of cross-linking the curable elastomer composition by exposure to elevated temperature and elevated pressure.

* * * * *